United States Patent Office 3,506,458
Patented Apr. 14, 1970

3,506,458
POTATO STORAGE METHOD
Robert T. Martin, 1708 East 4800 South,
Salt Lake City, Utah 48107
No Drawing. Continuation-in-part of application Ser. No. 591,300, Nov. 1, 1966. This application Dec. 26, 1967, Ser. No. 693,092
Int. Cl. A23b 7/00
U.S. Cl. 99—154                    6 Claims

ABSTRACT OF THE DISCLOSURE

A storage method which comprises storing crops in an environment having a relative humidity greater than 50 percent which is provided by spraying an aqueous solution of 0.5 to 20 weight percent hydrogen peroxide into an air stream, maintained at a temperature of 32 to 80 degrees Fahrenheit, which is circulated around the stored crops. The crops can also be dipped in an aqueous hydrogen peroxide bath and stored in a humid environment after removal from said bath.

---

This is a continuation in part of my co-pending United States patent application Ser. No. 591,300, filed Nov. 1, 1966, now U.S. Patent No. 3,445,246.

This invention relates to a method for storing potatoes, and in particular, to a method for building the resistance of potato tubers and similar crops to rot, bacterial mold and fungus infections.

It is an established practice to store potatoes and other crops in enclosed storage structures until they can be shipped to the various markets. It has been found that when the crops, and particularly potatoes, are stored under high temperatures and/or high humidity conditions without the use of a decay preventive storage method such as described in my co-pending United States patent application, Ser. No. 591,300, the occurrence of bacterial mold and fungus infection and rot in the stored crops is increased. Examples of such storage diseases are blight, dry rot, gangrene, water rot, black heart, etc. Accordingly, a great need has arisen for storage methods which prevent decay, rot, and infection in such crops.

It is the principal object of this invention to provide a method for storing potatoes and other crops which increases the resistance of the crops to rot, bacterial mold, fungus infection, and the like, while also preventing dehydration.

Briefly, the method of this invention comprises spraying an aqueous solution of 0.5 to 20 weight percent hydrogen peroxide into an air stream which is circulated around the stored crops. Preferably the relative humidity of the air stream is greater than 50 percent. The crops can also be dipped in an aqueous bath containing 0.5 to 20 weight percent hydrogen peroxide and then stored in a controlled environment after their removal from the bath.

After the potates are harvested the potato tuber becomes a dormant but living organ and changes in its chemical composition are inevitable as a result of processes which continue during said dormant period such as the conversion of starch to sugar and the oxidation of sugar, with the production of carbon dioxide, during respiration. Dry matter is thus lost during storage at a rate depending upon the rate of respiration, and in addition, the starch/sugar ratio may be altered according to the equilibrium struck between the conversion of starch to sugar on the one hand, and the oxidation of sugar on the other. There may also be loss of water from the tubers, the extent of which, for all practical purposes, depends on the relative humidity of the environment and the rate of air movement over the tubers. Potato tubers are conventionally stored at temperatures within the range of 32 to 45 degrees Fahrenheit to prevent tuber rot and decay while still maintaining the potatoes at a temperature which is high enough to prevent freezing. At temperatures within this range, the respiration process is retarded wherein the sugar concentration in the stored tubers is substantially increased. When the tubers are stored under these conditions for a substantial period of time, the sugar concentration increases until the potatoes are no longer edible. However, by using the process of this invention, potatoes and other similar crops may be stored under temperature conditions which prevent the accumulation of sugars while also preventing secondary rot, decay, and infection in the crops which often occur in storing.

In practicing the method of this invention the crops are stored in a hydrogen peroxide environment at a temperature in the range of about 32 to 80 degrees Fahrenheit, and preferably at an elevated temperature of 45 to 75 degrees Fahrenheit, and most preferably at about 50 to 55 degrees Fahrenheit. The hydrogen peroxide is preferably placed in the environment by spraying an aqueous solution containing at least 0.2 weight percent hydrogen peroxide, and most preferably 0.5 to 20 weight percent hydrogen peroxide, into an air stream which is circulated around the stored crops. When this method is used, the relative humidity of the environment surrounding the crops is maintained at a level greater than 50 percent, and preferably at about 80 to 98 percent. The high humidity hydrogen peroxide environment accomplishes several functions. Firstly, it is thought that a thin hydrogen peroxide coating is formed over the stored crops to act as a preservative which kills bacteria and fungus. Secondly, the stored potatoes are prevented from losing weight because of dehydration. Since it is conventional practice to store newly harvested potatoes in a bulk fashion, it is preferable to circulate the high humidity hydrogen peroxide environment through the potato stacks to insure treatment of all of the stored potatoes.

While it is preferred to circulate a high humidity hydrogen peroxide environment around the stored crops it is also within the scope of this invention to dip the crops to be stored in an aqueous bath containing 0.5 to 20 weight percent hydrogen peroxide. The crops are then removed from the bath and preferably stored in an air environment maintained at a temperature within the range of about 32 to 80 degrees Fahrenheit and a relative humidity greater than 50 percent and preferably 80 to 98 percent. The crops may be periodically redipped in the hydrogen peroxide bath to maintain their resistance to secondary rot, mold, and fungus infections.

It is to be noted that the phrase "secondary rot and decay" as used in the foregoing specification and in the claims refers to rot and decay occurring as a result of storage.

The following examples will illustrate modes of practice of the invention and will demonstrate the results obtainable thereby:

EXAMPLE 1

One thousand sacks of newly harvested Kennebec potatoes having a harvest pulp temperature of 64 degrees Fahrenheit were placed in a storage cellar which was maintained at a substantially constant temperature of 48 degrees Fahrenheit. The atmosphere surrounding said potatoes was maintained at a relative humidity of between 90 to 95 percent by spraying an aqueous solution of 8 weight percent hydrogen peroxide into an air stream which was circulated around the potatoes. At the end of a forty day storage period the potatoes showed no sign of secondary rot due to storage.

EXAMPLE 2

One thousand sacks of newly harvested Kennebec potatoes having a harvest pulp temperature of 64 degrees Fahrenheit were placed in a storage cellar which was maintained at a substantially constant temperature of 48 degrees Fahrenheit. The potatoes thus stored were harvested from the same field and at the same time as the potatoes tested in Example 1. The atmosphere surrounding the potatoes was maintained at a relative humidity of between 90 and 95 percent for a period of forty days. At the end of the forty day storage period approximately 20 percent of the stored potatoes showed signs of secondary rot and decay due to storage.

EXAMPLE 3

Idaho Russett potatoes stored for a period of six months at a temperature of about 35 to 40 degrees Fahrenheit were separated into two groups of one thousand sacks each. One group of the potatoes was placed in a storage cellar which was maintained at a constant temperature of about 50 degrees Fahrenheit and the atmosphere surrounding said potatoes was maintained at a relative humidity of between 90 and 95 percent by spraying an aqueous solution of 6 weight percent hydrogen peroxide into an air stream which was circulated around the potatoes. The second group of potatoes was stored under similar conditions with the exception that no hydrogen peroxide was present in the atmosphere surrounding said potatoes. At the end of a sixteen day period none of the potatoes stored in the hydrogen peroxide atmosphere showed signs of secondary decay and rot due to the high temperature and humidity conditions under which they were stored. In contrast, 15 percent of the potatoes stored out of the hydrogen peroxide environment showed signs of secondary decay and rot.

EXAMPLE 4

One thousand Idaho Russett potatoes were stored for three months at a temperature of about 40 degrees Fahrenheit. Analysis of the potatoes indicated the following results:

| | |
|---|---|
| Moisture content (percent) | 75 |
| Yeast content | 90 |
| Mold content | 10,000 |

A second thousand pounds of Idaho Russett potatoes were stored in a confined storage enclosure which was maintained at a substantially constant temperature of 48 degrees Fahrenheit. The atmosphere surrounding the potatoes was maintained at a relative humidity of 90 to 95 percent by spraying an aqueous solution of hydrogen peroxide into an air stream which was circulated around the stored potatoes. Analysis of the stored potatoes showed the following results:

| | |
|---|---|
| Moisture content | 83%. |
| Yeast content (unpeeled) | Negative. |
| Yeast content (peeled) | Do. |
| Mold content (unpeeled) | Do. |
| Mold content (peeled) | Do. |

EXAMPLE 5

One hundred pounds of Idaho Russett potatoes were immersed in an aqueous bath containing 2 weight percent hydrogen peroxide. The baptized potatoes were then removed from the bath and stored at a temperature of 50 degrees and at a relative humidity of 90 to 95 percent for two months. At the end of the storage period the potatoes showned no sign of secondary rot or decay. The above outlined test was repeated with the exception that the potatoes were not immersed in the aqueous hydrogen peroxide bath. At the end of the two month storage period 15 percent of the potatoes showed signs of secondary decay and rot.

I claim:
1. A method for storing potato tubers which comprises circulating an air stream about said potato tubers, said air stream containing hydrogen peroxide maintained at a concentration sufficient to reduce secondary rot and decay in said potato tubers.
2. The method of claim 1 wherein said hydrogen peroxide is provided in said air stream by spraying a solution of hydrogen peroxide into said air stream.
3. The method of claim 2 wherein said air stream is maintained at a relative humidity of at least 50 percent.
4. The method of claim 3 wherein said air stream is maintained at a temperature of 32 to 80 degrees Fahrenheit.
5. The method of claim 1 wherein said hydrogen peroxide solution is an aqueous solution containing at least 0.2 weight percent hydrogen peroxide.
6. The method of claim 5 wherein said air stream is maintatined at a relative humidity of at least 50 percent.

References Cited

UNITED STATES PATENTS 3,101,271   8/1963   Croall _____ 99—154

OTHER REFERENCES

Norman W. Desrosier: The Technology of Food Preservation, Air Publishing Co., Inc., Westport, Conn., 1959, p. 306.

Talburt and Smith: Potato Processing, Air Publishing Co. Inc., Wesport, Conn., 1959, pp. 177–78.

A. LOUIS MONACELL, Primary Examiner

WILLIAM A. SIMONS, Assistant Examiner

U.S. Cl. X.R.

99—100, 156